Figure 1:
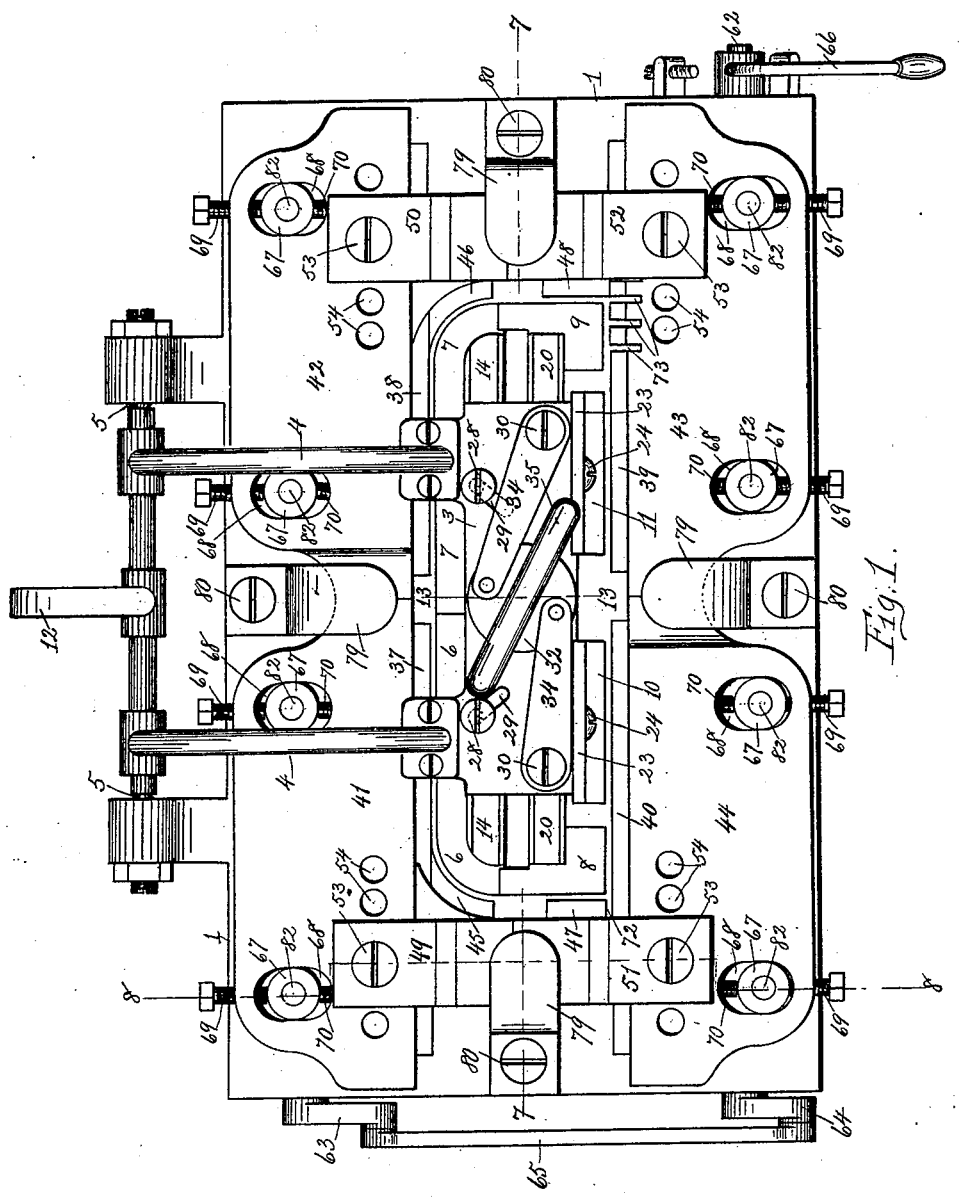

No. 666,766. Patented Jan. 29, 1901.
J. MAITLAND & W. J. BEATTIE.
MACHINE FOR FOLDING COLLARS, &c.
(Application filed Dec. 29, 1899.)
(No Model.) 6 Sheets—Sheet 3.

Witnesses:
E. M. O'Reilly
John Keit

Inventors:
John Maitland and
Walter John Beattie
By Mosher & Curtis
Attys.

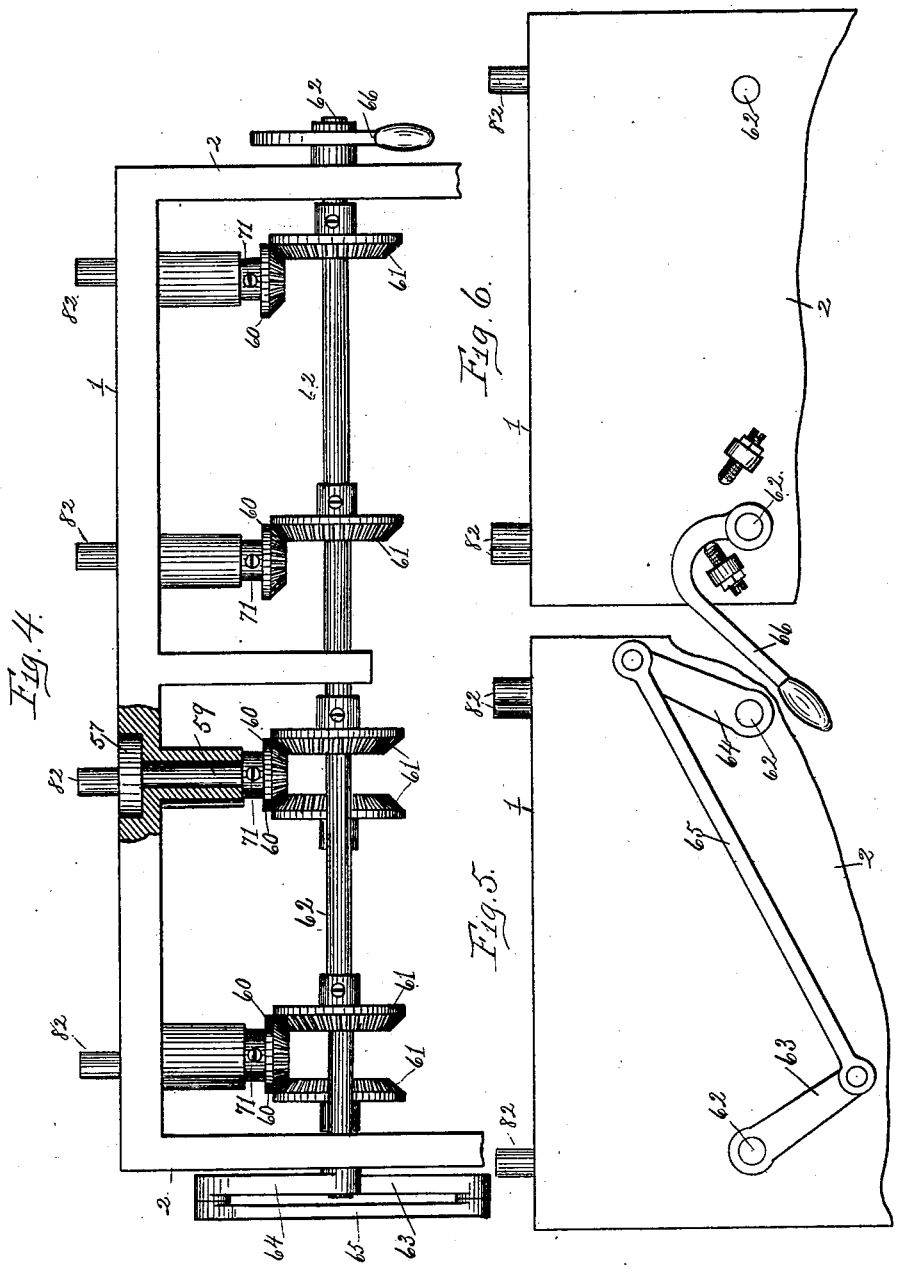

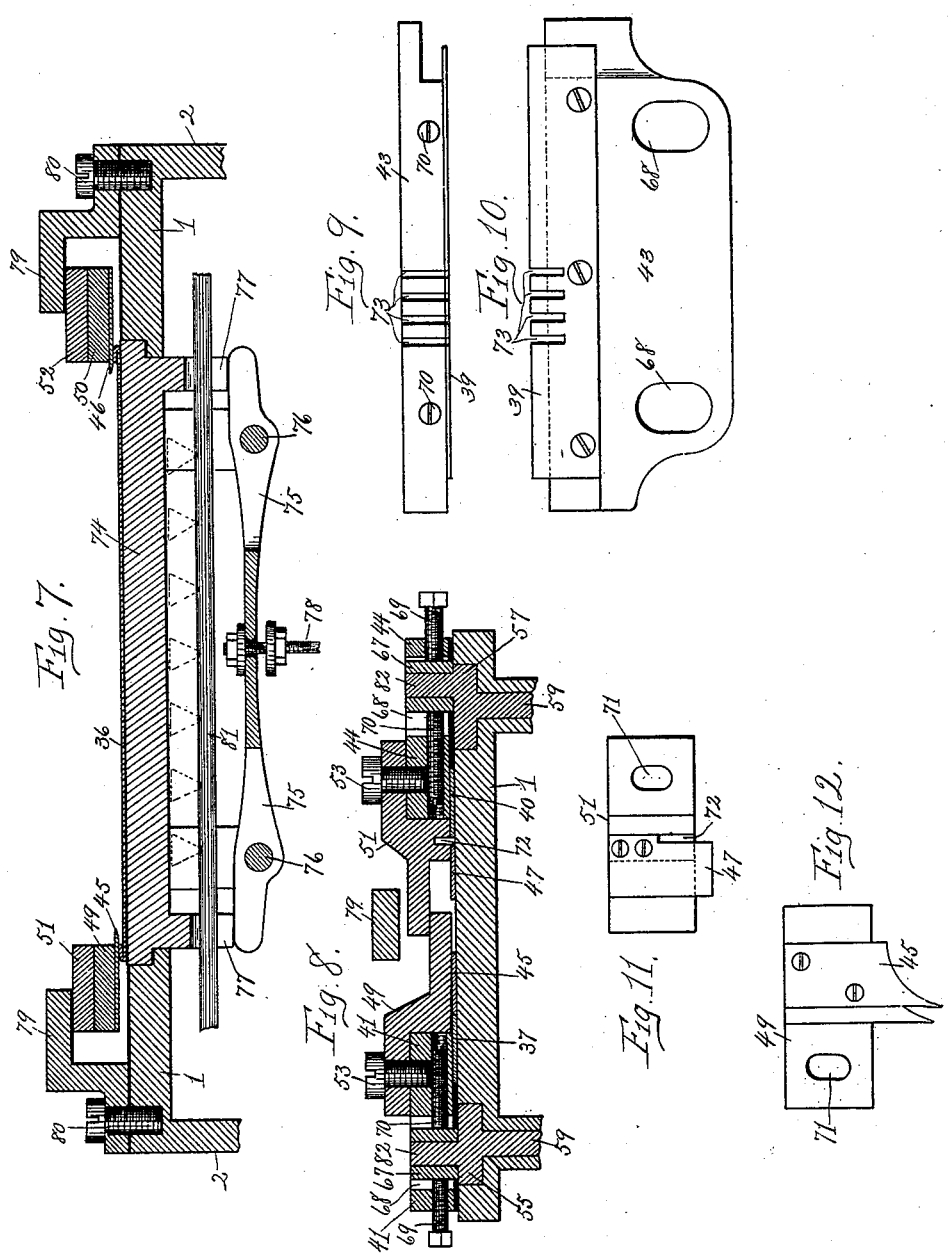

No. 666,766. Patented Jan. 29, 1901.
J. MAITLAND & W. J. BEATTIE.
MACHINE FOR FOLDING COLLARS, &c.
(Application filed Dec. 29, 1899.)
(No Model.) 6 Sheets—Sheet 6.
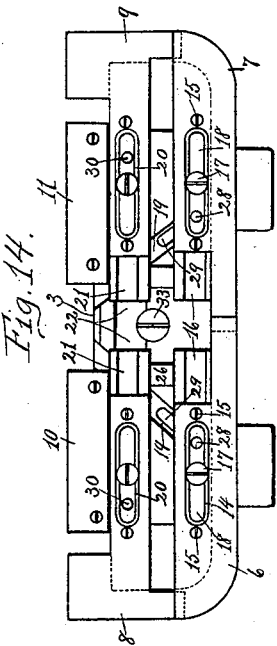
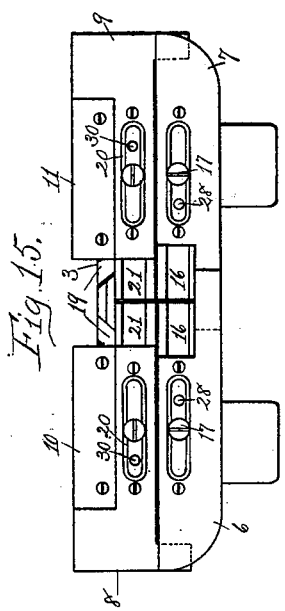
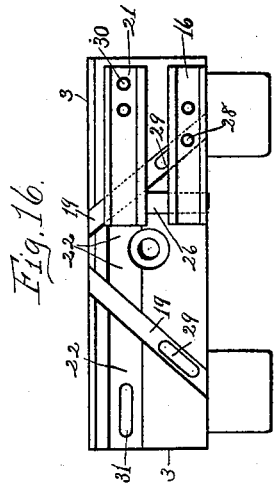
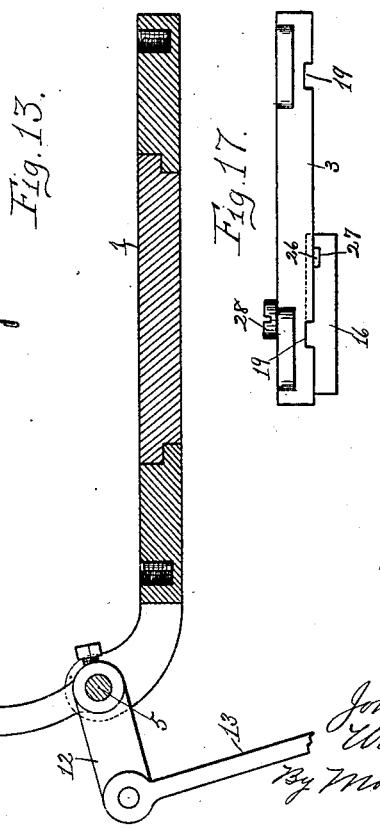
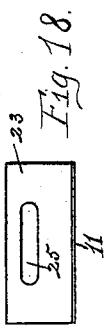
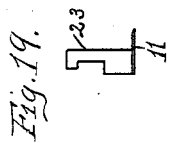
Witnesses:
E. M. O'Reilly
John Neil
Inventors:
John Maitland and
Walter John Beattie
By Mosher & Curtis
attys.
THE NORRIS PETERS CO., PHOTO-LITHO., WASHINGTON, D. C.

UNITED STATES PATENT OFFICE.

JOHN MAITLAND AND WALTER JOHN BEATTIE, OF COHOES, NEW YORK.

MACHINE FOR FOLDING COLLARS, &c.

SPECIFICATION forming part of Letters Patent No. 666,766, dated January 29, 1901.

Application filed December 29, 1899. Serial No. 741,881. (No model.)

*To all whom it may concern:*

Be it known that we, JOHN MAITLAND and WALTER JOHN BEATTIE, citizens of the United States, residing at Cohoes, county of Albany, and State of New York, have invented certain new and useful Improvements in Folding-Machines, of which the following is a specification.

The invention relates to such improvements; and it consists of the novel construction and combination of parts hereinafter described and subsequently claimed.

Reference may be had to the accompanying drawings and the reference characters marked thereon, which form a part of this specification.

Similar characters refer to similar parts in the several figures.

Figure 2:
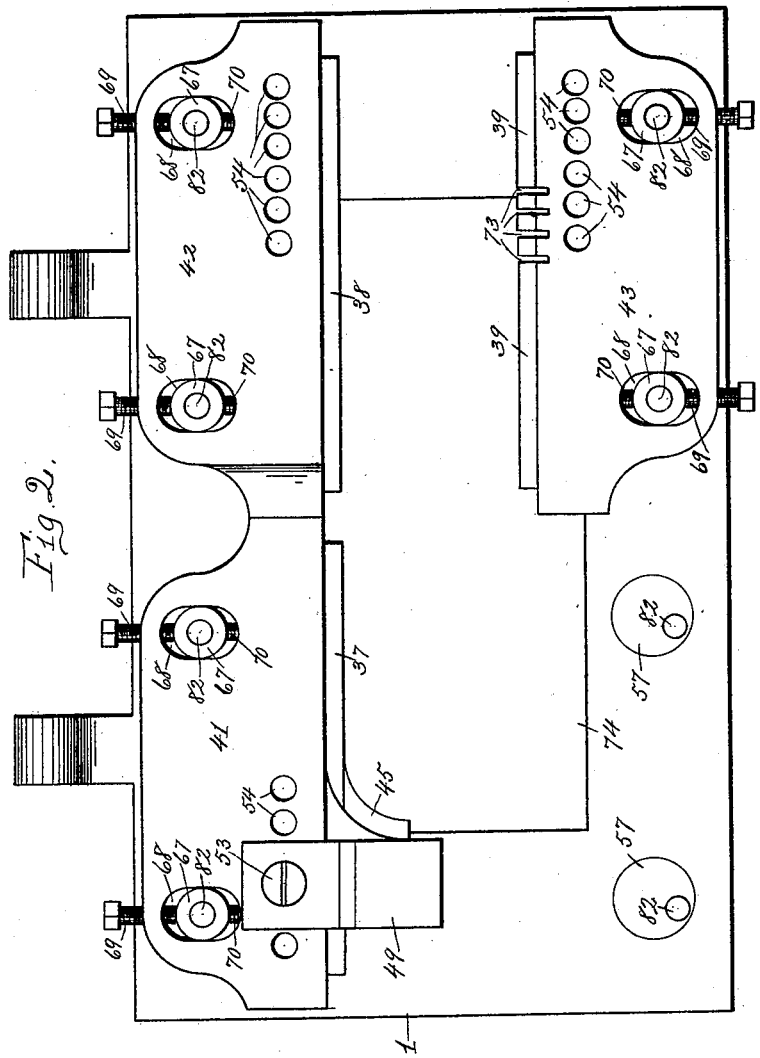
Figure 3:
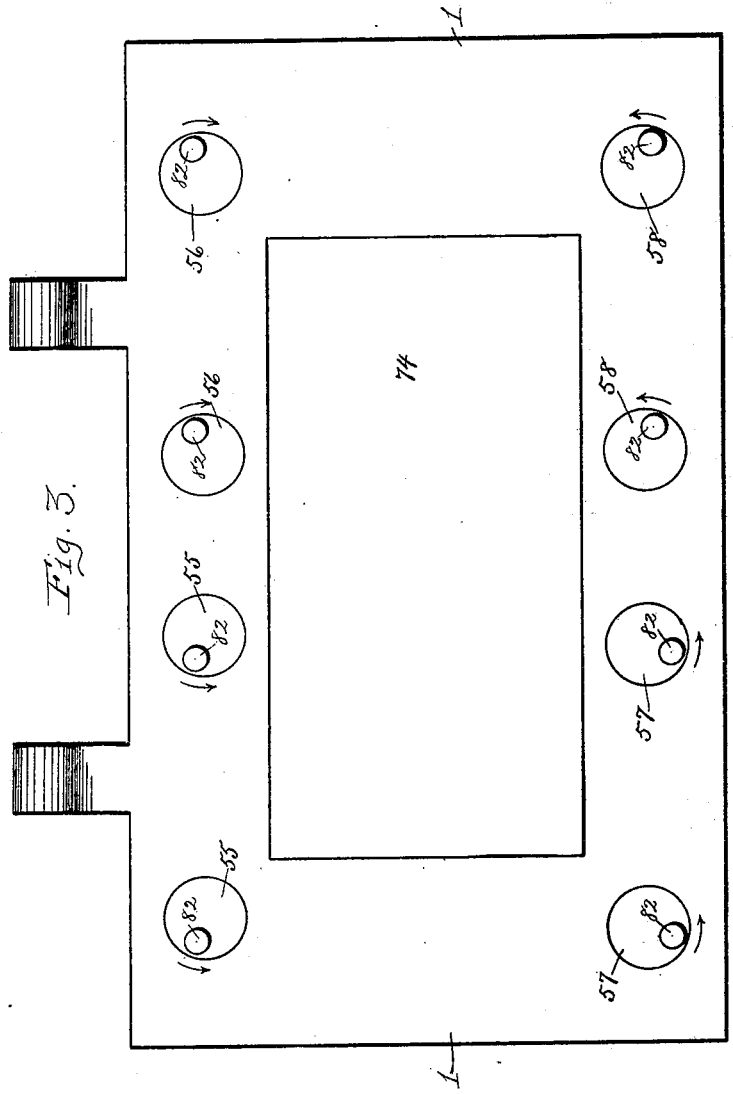

Figure 1 of the drawings is a top plan view of the improved folding-machine. Fig. 2 is a similar view of the bed and three of its folders. Fig. 3 is a similar view of the bed, the former and folders being removed. Fig. 4 is a view in front elevation of the machine with the former and folders removed. Fig. 5 is an end view of the same as seen from the left-hand side of Fig. 4. Fig. 6 is a similar view of the opposite end of the machine. Fig. 7 is a central vertical longitudinal section taken on the broken line 7 7 in Fig. 1, with the former removed. Fig. 8 is a vertical cross-section taken on the broken line 8 8 in Fig. 1. Fig. 9 is a side view of one of the side-folders detached. Fig. 10 is a bottom plan view of the same. Fig. 11 is a bottom plan view of an end-folder detached. Fig. 12 is a similar view of the contiguous end-folder detached. Fig. 13 is a central vertical cross-section of the machine, taken on the broken line 13 13 in Fig. 1, showing the former in an elevated position. Fig. 14 is a bottom plan view of the former in an expanded position. Fig. 15 is a similar view of the former contracted. Fig. 16 is a similar view of the former-head and two of the slideway-blocks mounted on the head. Fig. 17 is a side view of the same viewed from the rear. Fig. 18 is a side view of one of the stationary front folders detached. Fig. 19 is an end view of the same.

This invention relates to improvements in machines for inturning the edges of fabric blanks in the manufacture of collars and cuffs, and relates particularly to the construction of the former and folder and to the means for producing operative movements of the folders, whereby the edges of the blanks are inturned over and upon the edges of the former.

Referring to the drawings, 1 is the bed of our improved machine, supported by suitable uprights 2.

3 is the former-head, supported by a frame 4, pivoted to the bed of the machine at 5, which former-head supports the former-plates 6, 7, 8, 9, 10, and 11.

The former is movable toward and from the bed in the path of an arc of a circle, and may be moved toward and from the bed in any known manner, as by the arm 12 and the link 13, connecting said arm with a treadle (not shown) or other well-known operating means.

The folders are arranged upon the bed surrounding the space occupied by the former when resting upon the bed and are constructed and operated in a manner to coöperate with the former to inturn the edges of the fabric blank, as will be hereinafter more particularly explained.

The former is preferably provided with forming edges on all four sides, with the edges on three sides contractile and on the fourth side non-contractile, the former shown in the drawings being adapted to fold a half-round cuff—that is, a cuff having two rounded corners and two square corners.

The rear side and curved corner-former plates 6 and 7 are severally attached to a former-plate block 14, as by the screws 15, which former-plate block is mounted upon a slide-block 16, whereon it is adjustably secured by the screw 17, passed through the slot 18 in the former-plate block into the slide-block 16, which screw-and-slot connection permits of an adjustment of the former-plates upon the slide-blocks to adapt the former for different sizes of blanks. Each of these slide-blocks 16 fits into a grooved slideway 19 in the former-head, these two slideways extending obliquely and at an angle to each other of about ninety degrees. The end plates 8 and 9, which also form the other corners of the blank, are similarly mounted upon the former-plate blocks 20, which are in like manner adjustably mounted upon the slide-blocks 21, which fit into the slideway-grooves 22 in the former-head, extending longitudinally thereof and parallel with the sides of the head and in line with each other. These four former-plates 6, 7, 8, and 9 constitute the contractile portion of the former, the front side of the former being non-contractile transversely and being provided, preferably, with two former-plates 10 and 11, which are severally mounted upon a supporting-block 23, which is adjustably secured to the former-head by a screw 24, passed through the elongated slot 25 in the block and into the head, whereby the block may be adjusted upon the head and secured in fixed relation thereto when adjusted. It will thus be seen that by moving the slide-blocks in their respective slideways in the former-head the former-plates 8 and 9 will be moved toward each other in a line parallel with the side of the head, while the plates 6 and 7 will be moved in oblique lines toward each other and also toward the plates 8 and 9. Slide movements may be imparted to the slide-blocks in any known manner.

As shown in the drawings, each of the slide-blocks 21 is provided with a laterally-projecting arm 26, which loosely fits in a recess 27, formed in one of the slide-blocks 16, whereby the two slide-blocks are connected to move in unison longitudinally of the head, while leaving the slide-block 16 as it moves along its oblique slideway free to move toward and from the slide-block 21.

The slide blocks 16 are supported in their respective slideways by means of the screws 28, which are free to move in the slots 29, formed in the head, and the slide-blocks 21 are similarly supported in their slideways by screws 30, free to move in the respective slideways 31 in the former-head.

Slide movements are imparted to the slide-blocks 21 by means of the crank-disk 32, rotatably connected with the former-head by screw 33 and connected with the respective screws 30 by means of the links 34.

A partial rotary movement may be imparted to the crank-disk by means of an operating-handle 35, whereby the several slide-blocks and their connected former-plates may be operated to expand and contract the former on three sides. It will thus be seen that the former may be expanded to the form shown in Fig. 14 and maintained in that condition during the folding operation, after which the former may be contracted on three sides, whereby the forming-plates are withdrawn from the folded edges of the blank on such three sides, and after the blank has been released on all sides of the folders the former may be raised from the bed of the machine and will carry with it the folded blank which remains connected with the former on one side by means of the transversely non-contractile former-plates which remain inserted in the fold on that side.

The relative position of the blank 36 and the former when raised is shown in Fig. 13, in which position the blank can be easily removed from the former without disturbing any of its edge folds. By this means we are able at the end of each folding operation to place the folded blank in a position easily accessible for removal from the machine, instead of leaving the same resting upon the bed, as is the common practice. We are thus able to greatly facilitate the folding operation. Any desired form may be given to the former-plates.

The folding mechanism comprises the folders, arranged, preferably, on all sides of the former, and mechanism whereby the folders are moved toward and from the former to cooperate therewith in folding the edges of the blank. As shown, the folders comprise four side-folder plates 37, 38, 39, and 40, mounted upon the respective supporting-blocks 41, 42, 43, and 44, and the end-folder plates 45, 46, 47, and 48, mounted upon the respective blocks 49, 50, 51, and 52. Each of the end-folder blocks is mounted upon and adjustably secured to a side-folder block, as by the screw 53, inserted through an elongated slot in the end-folder block into a selected one of the screw-apertures 54, formed in the side-folder block, whereby the folders may be adapted for different sizes of fabric blank. This adjustment may be accomplished in any known manner. Each side-folder plate is secured to the under surface of its folder-block with its straight edge projecting beyond the block, as shown. The end-folder blocks are each so mounted upon a side-folder block as to overhang and engage the top surface of the projecting edge of the side-folder plate, as shown in Fig. 8, and the end-folder plate is secured to the under surface of the end-folder block adjacent to that portion which rests upon the side-folder plate, as shown in said figure. By thus having the adjustable end-folder block bear upon the projecting edge of the side-folder plate said plate is supported and reinforced by the end-folder block in whatever position of adjustment the latter may be at the point where the greatest strain is exerted upon said plate by the work that is adjacent to the corner. The construction shown is adapted for folding a half-round cuff, the sides and ends of which are approximately straight, and it is thus possible to use the same folder-plates for different sizes, the side-folder plates all being approximately straight-edged, two of the end-folder plates being straight-edged and the other two being curved to conform to the desired shape of the rounded corners of the cuff.

As a means for moving and guiding the folders toward and from the former the bed of the machine is shown provided with a plurality of crank-disks 55, 56, 57, and 58, two for each side-folder block, each of said disks being fixed upon the upper end of a crank-shaft 59, rotary in bearings on the bed of the machine. The crank-disks are severally provided with crank-pin connections with the respective side-folder blocks, whereby partial rotary movements of the respective crank-shafts will cause the respective folders to be moved and guided toward and from the former.

As a means for simultaneously operating all of the crank-shafts each of said shafts is provided on its lower end with a bevel-gear 60, adapted to mesh with the bevel-gear 61 on one of the two parallel shafts 62, extending longitudinally of the machine beneath the bed, said parallel shafts being provided at one end of the machine with oppositely-projecting cranks 63 and 64, connected by a link 65, whereby a partial rotary movement imparted to one of said shafts will cause a reverse partial rotary movement to be imparted to the other of said shafts. At the other end of the machine one of these shafts 62 is provided with an operating arm or handle 66, whereby partial rotary movements may be imparted to the shaft to simultaneously operate all of the folders by means of the cranks and bevel-gear connections.

By means of the crank-disk and crank-pin connections with the folder-block it is possible to impart to the block a movement which will guide the folder toward and from the former-plate in the path of an arc of a circle of so short a radius that the initial and final movements of the folder are approximately at right angles to each other. It is also possible by means of the crank mechanism to adjust each particular folder for any desired movement and also to adjust the folders for different sizes of blanks.

Each of the crank-pins 82 has a bearing block or sleeve 67, which fits and is adjustably movable in an elongated slot 68, formed in a folder-block. This bearing-block is adjustably movably longitudinally of the slot and is secured in adjusted positions by means of the set-screws 69 and 70, inserted through the folder-block from opposite sides and adapted to bear upon opposite sides of the bearing-block, as shown. By loosening one of these screws and tightening the other any desired lateral adjustment of the folder relatively to the crank-pins which operate it can be secured, whereby the folders may be adapted for blanks of different widths.

Desired variations in movement of the folder-plate can be secured by changing the angular positions of the crank disks and pins, which can be accomplished by loosening the set-screws 71, which secure the bevel-gears 60 to their respective crank-shafts 59, and then turning the crank-disk, shaft, and pin to the desired angular position, after which they are locked in such position by again tightening the set-screw 71.

The angular position of the crank-pins is preferably varied in operating upon different styles of blank, it being especially desirable where the blank has a plurality of square corners to so fold those corners that when two folded blanks are applied to one another in the operation of making a collar or cuff the folds at these corners will interlock one with another, so that all raw edges are concealed between the blanks, as is well understood in the art. In folding the blanks so as to thus interlock it is necessary that one of the blanks should have at such a corner a side edge folded over upon the end edge, while the blank to be superposed thereon would have at the corresponding corner the end edge folded over the side edge.

As the machine shown in the drawings is adjusted for a half-round cuff-blank having two rectangular corners, the crank-pins are shown so arranged that at one of these corners the side edge of the blank will be folded over upon the end edge and at the other of said corners the end edge will be folded over upon the side edge, making each of the blanks so folded adapted to interlock with any similarly-folded blank when inverted and superposed thereupon in the operation of making a collar or cuff. The manner in which this is accomplished will be apparent from an inspection of Fig. 3, which shows the relative positions of the crank disks and pins at the commencement of the folding operation, the direction of movement of the several crank-disks being indicated by arrows, the amplitude of the movement of the crank-pins being about ninety degrees. The crank-disks 57 operate the folders at one of the square corners of the blank, and the crank-pins thereon are so arranged that the initial movement imparted thereto will be approximately parallel with the side edge of the blank, which movement causes the end-folder plate 47 to fold over the end edge of the blank upon the adjacent end of the former; but it will be seen that as the rotation of the disks 57 is continued until the crank-pin is moved through an arc of about ninety degrees the final movement of the folder will be approximately at right angles to its initial movement and approximately parallel with an end edge of the blank, whereby the side edge of the blank is folded over upon the adjacent side of the former, and upon the end edge of the blank which has already been folded over upon the former. The folders at the other rectangular corner are operated by pins on the crank-disks 58, which pins are arranged approximately ninety degrees in advance of the pins on the disks 57, as shown in Fig. 3. The initial movement of the pins on disks 58 will therefore be the initial movement which is approximately parallel with an end edge of the blank, thereby folding over the side edge of the blank upon the adjacent side of the folder, while the final movement of said pins will be in a line approximately parallel with the side edge of the blank and will cause the end edge of the blank to be folded over upon the adjacent end of the former. It will be readily seen that by similarly arranging the other crank disks and pins blanks, having four rectangular corners could be so folded that all four corners would interlock when two blanks were applied one to another. As the two remaining corners in the present case are round the particular movement of the crank disks and pins is immaterial, as the result is substantially the same on the rounded corner whether the side or end portion be first folded.

Any change in the position of the folder relatively to the former caused by changing the angular adjustment of its crank-pins can be compensated on the sides by means of the adjusting-screws 69 and 70 and on the ends by changing the screw 53 from one to another of the apertures 54 or by simply loosening said screw and adjusting the end-folder within the limits permitted by the elongated slot 71 therein, through which said screw passes.

In folding a rectangular corner of a blank by means of a single corner-folder or an adjacent side and end-folder connected to move together it is desirable to provide in the edge of the folder which first engages the blank a narrow slot adapted to receive the fullness of fabric temporarily, which is afterward to be folded over upon the edge first folded. We have shown such a slot 72 in the end-folder 47 and a plurality of such slots 73 in the side-folder 39, arranged at definite intervals in accordance with the usual variation in sizes of cuffs.

The end-folder block 52 is adapted to be secured to the side-folder block 43 in adjusted positions, such that its folder-plate 48 will be located in proper relation to a selected one of these slots 73.

The folded blanks may be pressed in any known manner. As a means for pressing blanks we have shown the bed of the machine provided with a vertically-movable section or plate 74, which plate is adapted to be forced upwardly toward the folders by means of the levers 75, pivoted at 76 to the frame of the machine and engageable with depending flanges 77 on the movable presser-plate. The inner ends of these levers are connected with a rod 78, leading to a treadle, whereby the levers may be operated to elevate the presser-plate and press the folded edges of the blank up against the folders. The treadle is not shown.

The upward movement of the folders is limited by the overhanging angle-plates or stops 79, secured to the stationary bed of the machine by screws 80, which angle-plates support the folders in resisting the upward pressure of the pressure-plate.

Portions of the folders, as the folder-blocks, are preferably constructed to overlap one another at their adjacent ends, and the angle-plates 79 are locked in position to overhang the overlapping portions of the folders, as shown.

When desired, the bed of the machine may be heated in any known manner, as by the gas-burner 81.

What we claim as new, and desire to secure by Letters Patent, is—

1. In a folding-machine, the combination with a former having a plurality of corners; of a plurality of separate relatively movable corner-folders, coöperative respectively with such corners of said former; a plurality of guide-cranks for each corner-folder; and actuating connections between such cranks and corner-folder, substantially as described.

2. In a folding-machine, the combination with a bed; and a former having a plurality of corners; of a plurality of separate corner-folders, one for each of said corners of the former; a plurality of cranks; and crank-pin connections between each corner-folder and a plurality of cranks and means for imparting to said cranks a limited movement of approximately ninety degrees, substantially as described.

3. In a folding-machine, the combination with a bed; and a former; of a plurality of separate relatively movable corner-folders coöperative respectively with corners of said former; a plurality of guide-cranks for each corner-folder; connections between such cranks and corner-folder; means for operating said cranks; heating mechanism for heating the bed; and means for pressing each fold between the bed and its corner-folder at the end of its folding movement, substantially as described.

4. In a folding-machine, the combination with a former; of a plurality of separate relatively movable corner-folders coöperative respectively with such corners of said former; a plurality of guide-cranks for each corner-folder; actuating connections between such cranks and corner-folder; and means for operating all the cranks of all the corner-folders simultaneously whereby the several corners of the blank will be simultaneously folded with a lock-fold, substantially as described.

5. In a folding-machine, the combination with a bed; and a former; of four corner-folders movable relatively to each other and coöperative respectively with the corners of said former; a plurality of guide-cranks for each corner-folder; actuating connections between such cranks and corner-folder; means for operating all of said cranks and corner-folders simultaneously; and means for simultaneously pressing the folds between their respective corner-folders and the bed, substantially as described.

6. In a folding-machine, the combination with a bed; and a former having a plurality of corners; of a pair of corner-folders coöperative with adjacent corners of the former respectively; a plurality of cranks; means for operating said cranks; crank-pin connections between each corner-folder and a plurality of cranks, the crank-pins connected with one of said corner-folders being arranged approximately ninety degrees in advance of those connected with the other, substantially as described.

7. In a folding-machine, the combination with a bed; and a former; of a folder having a plurality of elongated slots formed therein; bearing-blocks located in the respective elongated slots, means for adjusting the bearing-blocks and securing them in adjusted positions in the respective slots; a plurality of cranks; crank-pins on the cranks adapted to fit in the respective bearing-blocks; and means for operating said cranks, substantially as described.

8. In a folding-machine, a former contractible on three sides, and having on its fourth side a non-contractile forming edge, in combination with folders coöperative with all four sides of the former; a bed and pressing mechanism adapted to fix the fold of the blank upon the non-contractile edge of the former whereby the former when raised is caused to lift the blank by said fixed fold, and means for moving the former to and from the bed, substantially as described.

9. In a folding-machine, the combination with a bed; of a four-sided former mounted upon a pivoted support whereby it can be moved in the path of an arc of a circle to and from the bed, said former having its ends and the side adjacent the pivot of the support contractile and on the side opposite said pivot a transversely non-contractile forming edge; folding mechanism coöperative with all four sides of the former and pressing mechanism for fixing the fold of the blank upon the non-contractile edge of the former whereby the former when raised is caused to lift the blank by said fixed fold, substantially as and for the purpose set forth.

10. In a folding-machine, the combination with a bed; of a former-head having a pair of slideways parallel with the sides of the head and a pair of slideways oblique thereto; slide-blocks in the respective slideways; a pair of corner-forming plates fixed on the respective slide-blocks in the oblique slideways; a pair of corner-forming plates fixed on the respective slide-blocks in the other slideways; and folding mechanism, substantially as described.

11. In a folding-machine the combination with a bed; of a former-head having a pair of slideways parallel with the sides of the head and a pair of slideways oblique thereto; slide-blocks in the respective slideways; a pair of side and corner forming plates fixed on the respective slide-blocks in the oblique slideways; a pair of end and corner forming plates fixed on the respective slide-blocks in the other slideways, a side-forming plate tightly secured to the head intermediately of said end plates; means for moving said slide-blocks, and folding mechanism substantially as described.

12. In a folding-machine the combination with an approximately straight-edged side-folder block; of an approximately straight-edged side-folder plate secured to the under side of said block with its straight edge projecting therefrom; an end-folder block adjustably mounted upon the side-folder block in position to overhang and engage the top surface of the projecting edge of the side-folder plate; and an end-folder plate secured to the under surface of the end-folder block adjacent to its side-folder-plate-engaging portion, substantially as described.

13. In a folding-machine, the combination with a movable, approximately straight-edged side-folder having a plurality of fold-receiving edge slots; of a separate end-folder mounted upon and movable with said side-folder; and means for adjustably securing said end-folder to the side-folder in coöperative relation with a selected edge slot, substantially as and for the purpose set forth.

14. In a folding-machine, the combination with the stationary frame; of a movable presser-plate; a former; a pair of folders having portions of their adjacent ends overlapping one another; and a stop fixed to the stationary frame of the machine, and overhanging the overlapping portions of the folders, substantially as described.

In testimony whereof we have hereunto set our hands this 4th day of November, 1899.

JOHN MAITLAND.
WALTER JOHN BEATTIE.

Witnesses:
GEO. A. MOSHER,
FRANK C. CURTIS.